United States Patent [19]
Zunderdorp et al.

[11] 3,730,126
[45] May 1, 1973

[54] METHOD AND MEANS FOR DYNAMICALLY STATIONING A FLOATING VESSEL

[75] Inventors: Henricus J. Zunderdorp; Augustinus J. Berkhout, both of Rijawijk, Netherlands

[73] Assignee: Shell Oil Company, New York, N.Y.

[22] Filed: July 9, 1971

[21] Appl. No.: 161,147

[30] Foreign Application Priority Data

Dec. 21, 1970  Great Britain......................60,590/70

[52] U.S. Cl. ..............................................114/144 B
[51] Int. Cl. ...............................................B63h 25/04
[58] Field of Search........................114/144 R, 144 B; 343/100 CL, 100 R, 113, 114

[56] References Cited

UNITED STATES PATENTS

| | | | |
|---|---|---|---|
| 3,548,775 | 12/1970 | Hammond et al. | 114/144 B |
| 3,604,907 | 9/1971 | Wesner | 114/144 R |
| 3,646,334 | 2/1972 | Wold | 343/100 CL |

*Primary Examiner*—Milton Buchler
*Assistant Examiner*—Jesus D. Sotelo
*Attorney*—John G. Graham et al.

[57] ABSTRACT

A seagoing vessel such as an offshore oil rig is dynamically stationed by measuring the actual position of the vessel with reference to a desired position, filtering the deviation or error signal to remove higher frequency components due to wave action, and using the resultant signal to control multidirectional drive means.

11 Claims, 10 Drawing Figures

Patented May 1, 1973

H.J. ZUNDERDORP & A.J. BERKHOUT,
INVENTORS

BY John A. Graham

ATTORNEY

3,730,126

METHOD AND MEANS FOR DYNAMICALLY STATIONING A FLOATING VESSEL

BACKGROUND OF THE INVENTION

The invention relates to the dynamic stationing of a floating vessel to keep the deviation between the actual position of such vessel and a desired position small without the use of anchors. To this end, use is made of the propulsion unit(s) and/or the rudder(s) of the vessel, which means are controlled by signals representative of the deviation between the actual position of the vessel and the desired position thereof.

The position of a vessel may be indicated by at least one co-ordinate of a Cartesian co-ordinate system, a polar co-ordinate system or any other co-ordinate system in the horizontal plane suitable for the purpose and/or by the heading of the vessel which is indicated by the angle between an axis of the vessel and a pre-determined compass direction. For the sake of convenience, the heading of the vessel is considered hereinafter to be one of the co-ordinate suitable for indicating the position of a floating vessel.

In particular, the invention relates to a method for dynamically stationing a vessel, which vessel is provided with means for measuring along at least one co-ordinate the deviation of the vessel from a desired position and for creating a deviation signal representative of the measured deviation, and with means suitable to be controlled by a control signal derived from the deviation signal to reduce the deviation measured along the co-ordinate.

The invention further relates to means for dynamically stationing a vessel, the means comprising a system for measuring the deviation of a vessel along at least one co-ordinate from a desired position, and for creating a deviation signal representative of the measured deviation, and a control system connected to the measuring system and suitable to be connected to means adapted to reduce the deviation of a vessel as measured along the co-ordinate.

The means applied in the dynamic stationing of a vessel for reducing the deviation of the vessel from a desired position may be constituted by one or more propulsion units and/or one or more rudders. The propulsion units may be of various types, and may, inter alia, be formed by vertical axis propellers of the Voith-Schneider type, or by bow and/or stern thrusters which can create forces acting athwartships. They may further include propellers as applied for normal displacement of the vessel and suitable for raising forces acting fore and aft.

Dynamic stationing is of particular interest for vessels, barges or other floating units which are used for drilling wells into the sea or ocean bottom. However, dynamic stationing is further of interest for all other types of vessels which should be maintained close over a fixed location or close over a continuously or discontinuously changing location. As examples of vessels which should be kept over a fixed location during operation, oceanographic, weather, salvage and radar vessels may be mentioned. Fire boats, tugs, cranes, dredgers, and cable or pipe-laying barges should be able to be maneuvered between fixed locations, often along a predetermined route. Further, the method according to the invention may be applied for maintaining a vessel on a pre-determined course. Then, the deviation from a desired course along which the vessel should be sailing is measured, and signals representative of the measured deviation are used to control the propulsion unit(s) and/or the rudder(s) of the vessel.

The invention relates in particular to the problem of dynamically stationing vessels which are susceptible to wave action. Any displacement of a vessel resulting from wave action exerted thereon will be followed by a displacement in the opposite direction, which latter displacement is a result of the elliptical movements of the water particles constituting the waves. The time interval between each displacement and the subsequent return displacement depends on the periods of the waves in which the vessel is operating, and it will be appreciated that for relatively short period lengths, the dynamic positioning system of the vessel is better switched off as being superfluous or even unwanted since it may for certain wave periods even be responsible for starting oscillations.

However, since waves will occur simultaneously with water flow and/or wind, the dynamic stationing system cannot simply be switched off because no correction would then take place for those deviations from the desired position which result from wind and/or water flow acting on the vessel.

One object of the invention is to provide a method for dynamically positioning a vessel in such a manner that in composing the control signal the wave action exerted on the vessel is partly neglected, resulting in a control which shows no tendency to oscillate.

Another object of the invention is to provide a means for dynamically stationing a vessel, which means permit a relatively cheap operation of such vessel as it does not respond to those deviations which are automatically compensated by their very source. This minimizes unrequired action of the propulsion unit(s) and/or the rudder(s) of the vessel, and consequently reduces energy costs as well as maintenance costs of the propulsion unit(s) and/or the rudder(s).

Still another object of the invention is to optimize the operation of dynamic stationing means to increase the efficiency thereof.

SUMMARY OF THE INVENTION

According to the invention the method for dynamically stationing a floating vessel includes the steps of filtering the deviation signal by feeding the deviation signal to a filter capable of attenuating at least a selected portion of the component of the deviation signal resulting from wave action, and of applying the filtered signal for controlling the means capable of reducing the deviation.

The method according to the invention may further include the step of adapting the filter to variations in the power spectrum of the wave component present in the deviation signal.

The filtering step may include the steps of synthetizing a filter impulse response capable of generating from the deviation signal a signal representative of at least a selected portion of the wave component present in the deviation signal and subtracting this second signal from the first signal to form the filtered signal.

According to the invention, a means for dynamically stationing a floating vessel comprises (1) a system for measuring along at least one co-ordinate the deviation of a vessel from a desired position and for generating, in the time domain, a deviation signal that is representative of the measured deviation, (2) a controller, (3) an output suitable to be connected to means adapted to reduce the deviation of the vessel as measured along the co-ordinate, and (4) a filter for attenuating at least a selected portion of the wave component present in the deviation signal, the controller and the filter being interposed between the measuring system and the output.

BRIEF DESCRIPTION OF THE DRAWING

The invention will now be described with reference to the drawing which shows by way of example some embodiments of the invention.

DESCRIPTION OF PREFERRED EMBODIMENTS

Figure 1:
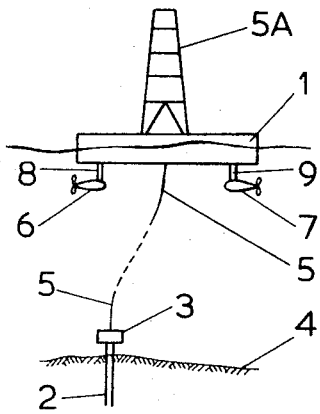
FIG. 1 shows schematically a side view of a vessel carrying a derrick and provided with dynamic stationing means.

The floating vessel 1 shown in FIG. 1 is suitable for carrying out drilling operation in a submerged well 2 having the wellhead 3 thereof located above the sea bottom 4. A tubing string 5 is suspended in the well 2 in a suitable manner (not shown since known per se) from the derrick 5A mounted on the vessel 1. For the sake of simplicity all other equipment required for carrying out drilling operations is omitted in the drawing.

The vessel 1 is provided with two propulsion units 6 and 7, which are rotatably arranged around axes 8 and 9, respectively, to vary the directions of the thrusts exerted thereby. These units are of conventional form and commercially available. The magnitude of the thrusts delivered by the units 6 and 7 is variable, so that by a suitable choice of the direction and magnitude of each thrust exerted by the propulsion units 6 and 7, the vessel 1 may be displaced from the actual position thereof to a desired position.

The manner in which the dynamic stationing means operates to reduce the deviation of the vessel 1 from the desired position, will now be explained with reference to FIGS. 2-6 of the drawing.

Figure 2:
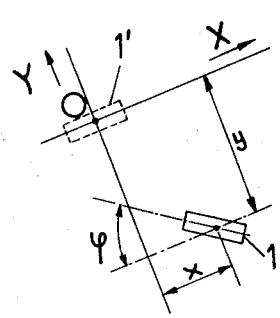
FIG. 2 shows in plan view the deviation from the desired position of the vessel according to FIG. 1.

As shown in FIG. 2, the position of the vessel 1 is indicated with reference to an X-axis and the Y-axis. These axes are the axes of a measuring system as applied for measuring the deviation of the actual position 1 of the vessel from the desired position 1' thereof. The desired heading is in the direction of the negative part of the X-axis. The angle deviation of the actual position with respect to the desired position is indicated by $\phi$. To reach the desired position 1', the vessel 1 should be rotated over the angle $\phi$, and displaced over the distances $x$ and $y$ in the directions of the X-axis and Y-axis respectively.

The instantaneous position of the vessel with respect to its desired position may be detected by any one of several known means, such as radar, sonar, optical or radio wave systems. The particular system used is not a part of the invention.

The deviation of the vessel 1 from the desired position 1' results from a combined action of waves, wind and water flow. The wave action exerted on the vessel 1 differs from the wind action and water flow in that any deviation resulting from the high frequency part of the waves acting on the vessel 1 is compensated within a relatively short period, since the oscillatory movement of the water particles forming the waves causes any object which is subjected to wave action to be oscillated to and fro around a mid position. Since any deviation of the vessel 1 from the desired position is automatically compensated within a short period for that part thereof which is due to the high frequency part of the wave action exerted on the vessel, the influence of this portion of the wave component of the deviation is neglected in the method according to the invention when composing the control signal for dynamically positioning the vessel 1.

Figure 3:
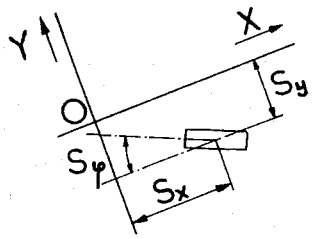
FIG. 3 shows a view similar to FIG. 2, but now indicating the position of the vessel as if no wave action was being exerted on the vessel.
Figure 4:
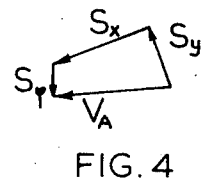
FIG. 4 indicates a vector diagram applied for calculating the action to be carried out by one of the propulsion units of the vessel according to FIG. 1, in order to move the vessel to the desired position.
Figure 5:
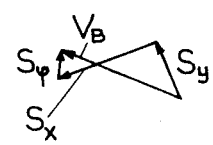
FIG. 5 shows another vector diagram, this diagram indicating the action to be carried out by other propulsion unit of the vessel according to FIG. 1, in order to move the vessel to the desired position.

By attenuating the high frequency portions of the wave components present in the components $x$, $y$ and $\phi$ (as indicated in FIG. 2) of the deviation signal in a manner as described in more detail hereinafter, signals $S_x$, $S_y$ and $S_\varphi$ remain, and these signals are representative of the deviation of the vessel 1 along the X-co-ordinate, the Y-co-ordinate and in a rotational sense, respectively. Thus, if the influence of the high frequency portion of the wave action would be neglected, the position of the vessel 1 could be indicated by the deviation signal components $S_x$, $S_y$ and $S_\varphi$ (FIG. 3). As shown in FIGS. 4 and 5, the thrust to be exerted by the propulsion units 6 and 7, respectively, to return the vessel to its desired location, can, in case only the deviation resulting from wind, water flow and the low-frequency wave components are to be counteracted, be bound by vertically adding the signals $S_x$ and $S_y$ and vertically adding the signals $S_\varphi$ for the propulsion unit 6 and vectorially subtracting it for the propulsion unit 7.

The thrust vectors $V_A$ and $V_B$ resulting from the vector diagrams as shown in FIG. 4 and 5, respectively, are representative of the magnitude and direction of thrust for the propulsion units 6 and 7, respectively.

Figure 6:
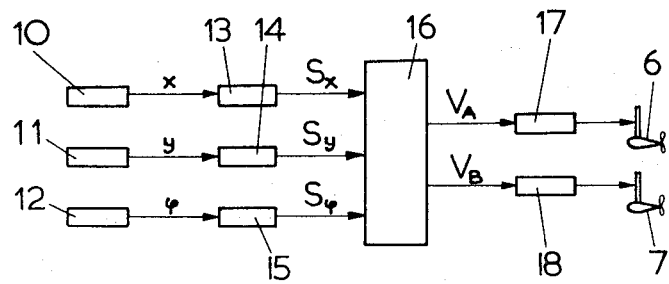
FIG. 6 shows schematically the flow of signals through the dynamic stationing means to the propulsion units of the vessel.

As schematically indicated in FIG. 6, the dynamic stationing means according to the invention comprises measuring units 10, 11 and 12 for measuring the deviation of the vessel from the desired position along the X-axis, and Y-axis and in a rotational sense with respect to the X-axis, respectively. As stated, these units may be any one of several conventional devices and are effective to produce electrical signals indicative of magnitude of deviation. The deviation signals $x$, $y$ and $\phi$ as measured by the units 10, 11 and 12, respectively, are the components of the displacement of the vessel in relation to the desired position as a result of wave action, wind action and water flow action exerted on the vessel. According to the invention, these signals are passed through filters 13, 14 and 15, respectively, whereby the wave components present in the deviation signals $x$, $y$ and $\phi$ are selectively attenuated, thus leaving the signals $S_x$, $S_y$ and $S_\varphi$ (compare FIG. 3), which are representative of the components of the deviation of the vessel from the desired position, under the influence of the action of the wind and water flow and the low frequency part of the water waves. Since the low frequency part of the wave components present in the deviation signal should be taken into account in the dynamic stationing action, it is not removed from the signals $x$, $y$ and $\phi$ by the filters 13, 14 and 15, respectively, and thus included in the signals $S_x$, $S_y$ and $S_\varphi$. The vectors $S_x$, $S_y$ and $S_\varphi$ are subsequently vectorially combined in the unit 16 as indicated in FIGS. 4 and 5, and the resulting vectors $V_A$ and $V_B$ describing the direction and magnitude of the correction signals to be supplied to the propulsion units 6 and 7, respectively, are passed thereto through controllers 17 and 18, respectively, which have proportional, and optionally derivative and/or integrating actions.

Figure 7:
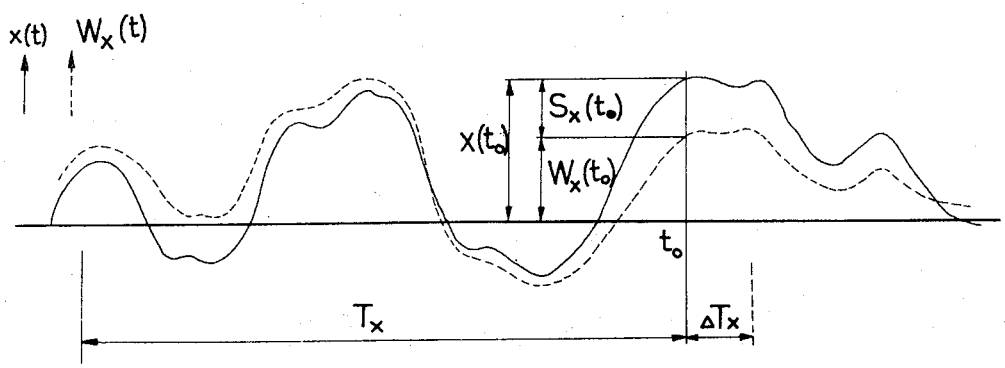
FIG. 7 shows the deviation signal and a selected portion of the wave component thereof in the time domain.

The time domain function $x(t)$ of the deviation signal along the X-axis as indicated in FIG. 7 over a certain period. The high frequency part $W_x(t)$ of the wave component present in this deviation signal $x(t)$ is indicated by the dashed curve. For each time $t$ the signal $S_x(t$ can be found by subtracting the high frequency part $W_x(t)$ of the wave component at time t from the deviation signal $x(t)$ at the same time $t$. By way of example this subtraction is indicated by the time $t_0$.

Figures 8, 9, 10:
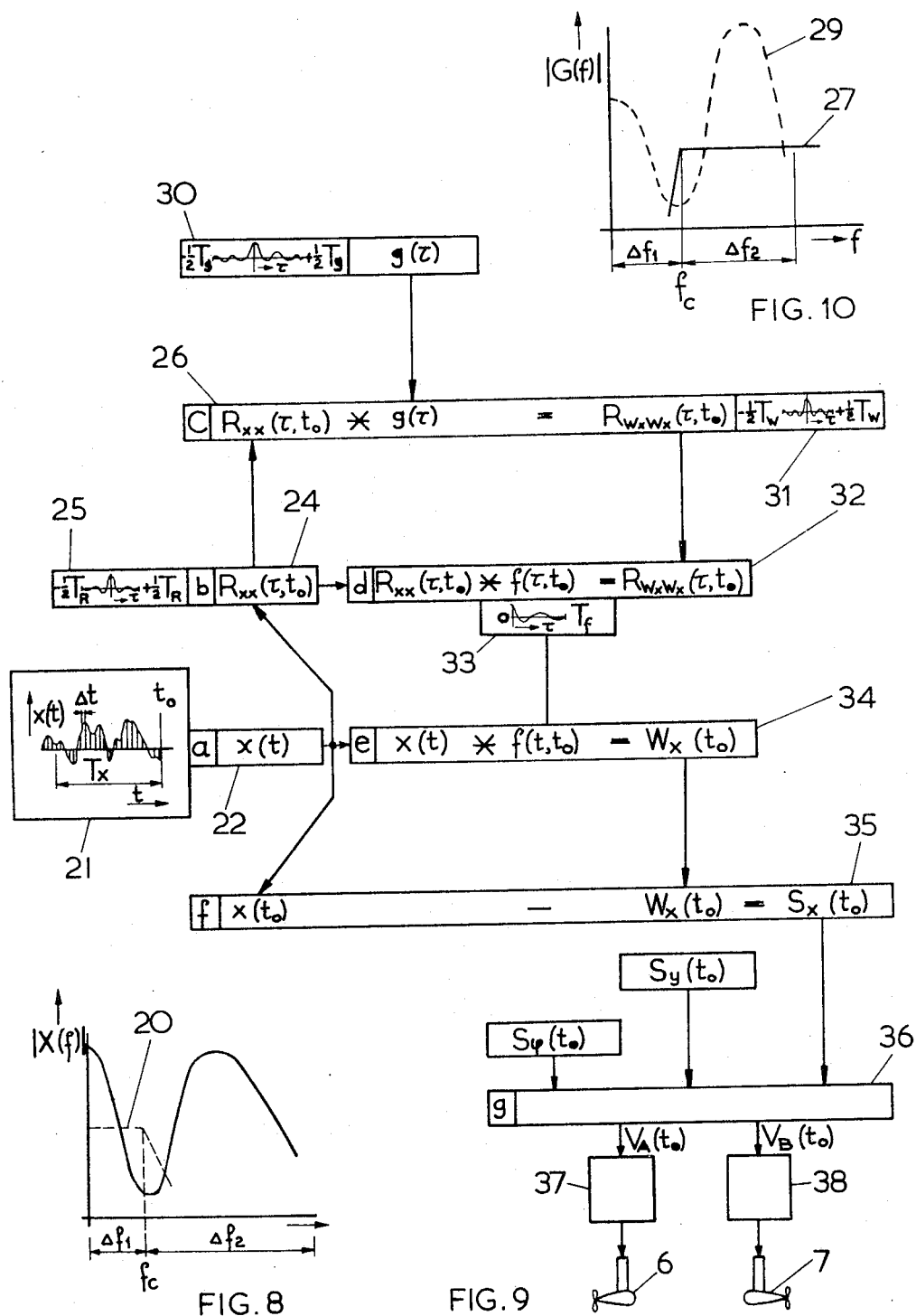
FIG. 8 shows the amplitude spectrum $|X(f)|$ of the deviation signal according to FIG. 7.
FIG. 9 shows schematically the steps to be carried out in the method according to the invention, and the calculating units in which these steps are carried out.
FIG. 10 shows the spectrum $|G(f)|$ of the amplitude of the transfer function $G(f)$ of a zero-phase filter having an impulse response $g(\tau)$, as shown in FIG. 9.

As shown in FIG. 8, the amplitude spectrum $|X(f)|$ of the signal $x(t)$ taken over a certain period of time (time window $T_x$ as indicated in FIG. 7) shows two sharply distinguished frequency bands. Frequency band $\Delta f_1$, in which relatively low frequencies occur, comprises that part of the deviation signal $x(t)$ which has to be compensated for in the dynamic stationing procedure. The amplitude spectrum within the band $\Delta f_1$ consists substantially of the deviation component resulting from wind action and water flow, whereas the amplitude spectrum of the frequency band $\Delta f_2$ consists substantially, if not solely, of the deviation component resulting from the high frequency part of the wave action. Thus, it can be said that the component of the deviation signal within the frequency band $\Delta f_2$ is formed by the signal $W_x(t)$, and that the component of the deviation signal within the frequency band $\Delta f_1$ is formed by the signal $S_x(t)$.

The high frequency portion of the wave component present in the frequency band $\Delta f_2$ of the deviation signal $x(t)$, which portion need not be compensated, can now be removed by selectively attenuating this wave component by passing the deviation signal $x(t)$ through a low pass filter of which the amplitude spectrum is indicated in FIG. 8 by the dashed curve 20. Since such filters are known per se they are not described here in detail. The filter cutoff frequency $f_c$ is chosen such that it is about equal to the upper limit of the frequency band $\Delta f_1$. As the width of the band $\Delta f_1$ should be varied with changing water depth and/or weather conditions, the filter should be equipped with a variable cut-off frequency $f_c$. Such a filter, which is applied as filter 13 in the dynamic stationing means according to FIG. 6, may be formed by an electrical network, to which electrical signal $x(t)$ is supplied to the input thereof and a signal $S_x(t)$ is derived from the output thereof. The signal $S_x(t)$ is, however, due to an inevitable phase lag of the electrical filter, not available at time $t_0$, but at some time $\Delta T_x$ after time $t_0$.

If the signal $x(t)$ is passed in digital form through the dynamic stationing means as schematically indicated in FIG. 6, the electrical network mentioned above may be simulated by a digital calculating unit, which convolves the impulse response of a filter with amplitude spectrum 20 (vide FIG. 8), with the signal $x(t)$ over the time window $T_x$ preceding the time $t_0$ (as indicated in FIG. 7). The result of this convolution is then signal $S_x$ which, however, due to an inevitable phase lag of such a filter, is not available at time $t_0$, but at some time $\Delta T_x$ after time $t_0$.

It will be understood that the same operations as described with reference to FIG. 8 may be carried out for determining the signals $S_y$ and $S_\varphi$.

For a given shape of the amplitude spectrum of the filter, the time lag $\Delta T_x$ is minimal if the filter is a minimum phase filter. However, if this minimum time lag $\Delta T_x$ is considered still too large for a particular dynamic stationing operation, a higher speed system will have to be used, which system will now be described with reference to FIG. 9.

FIG. 9 shows in schematic form the calculating units to be applied and the steps which are to be carried out when it is desired to remove almost instantaneously by filter action the selected high frequency part of the wave component present in the x-component of the deviation signal. In the various blocks as shown in FIG. 9, these steps are indicated by reference letters $a$, $b$, $c$, $d$, $e$, $f$ and $g$.

The deviation signal $x(t)$, shown as a function of time by curve 21, is sampled every second and stored in a memory section 22. The successive values are sampled within a time window $T_x$. The time window $T_x$ ranges from $t_0-T_x$ to $t_0$ ($t_0$ being the time at which the latest sample has been measured).

If the time window $T_x$ extends over a period of 500 seconds, then 500 samples of $x(t)$ will be stored in the memory unit 22. Each new second, one more sample will be added to this memory unit 22 and one other, namely the oldest sample, will be discarded therefrom (step $a$).

Once every $T_p$ seconds ($T_p$ having, e.g., a value of 500 seconds), the auto-correlation function of the signal $x(t)$ thus stored is calculated in calculating unit 24 (step $b$). This auto-correlation function $R_{xx}(\tau, t_0)$ having a length of $T_R$ seconds (vide reference numeral 25) is stored for $T_p$ seconds and is applied in calculating unit 26 (step c) for obtaining the auto-correlation function of the signal that is representative of a selected part of the wave component present in the deviation signal $x(t)$. This auto-correlation function $R_{w_x w_x}(\tau, t_0)$ is obtained by convolving the auto-correlation function $R_{xx}(\tau, t_0)$ with the impulse response $g(\tau)$ of a filter, of which the transfer function $G(f)$ has an amplitude spectrum (as indicated by curve 27 in FIG. 10), with relatively high values for a frequency band $\Delta f_2$ corresponding to the frequency band of the selected portion of the wave component present in the deviation signal, and relatively low values for a frequency band $\Delta f_1$, and having a phase spectrum that is zero for all frequencies. The cut-off frequency $f_c$ corresponds to the lowest frequency of the selected portion of the wave component which is to be removed from the signal $x(t)$. It will be appreciated that the parameters of the filter with the impulse response $g(\tau)$ may be varied from time to time. Thus, parameter $f_c$ may be varied with varying weather conditions and/or water depths.

The convolution operation in step c, as carried out in calculating unit 26, is indicated by the symbol *.

The auto-correlation function $R_{w_x w_x}(\tau, t_0)$ resulting from the convolution carried out by the calculating unit 26 is represented by the curve 31. The length of the function is indicated by $T_w$.

Subsequently, the filter impulse response function $f(\tau, t_0)$ with $T_f$ is determined by calculating unit 32 (step d) by deconvolving the auto-correlation function $R_{w_x w_x}(\tau, t_0)$ with respect to the auto-correlation function $R_{xx}(\tau, t_0)$. In other words, a function $f(\tau, t_0)$ (vide diagram 33) is determined, which when convolved with the auto-correlation function 25 of the deviation signal $x(t)$ will result for the time window $O-T_f$ in the auto-correlation function 31 of the signal which is representative of the selected part of the wave action component present in the deviation signal.

Since the power spectrum of the wave action component present in the deviation signal $x(t)$ can be considered constant for a certain period of time $T_p$ (say, 500 seconds), the filter $f(\tau, t_0)$ need only be computed every $T_p$ seconds.

The impulse response of the filter $f(\tau, t_0)$ is convolved with the stored deviation signal $x(t)$ in calculating unit 34 (step e) to calculate $W_x(t_0)$, being the selected high frequency part of the wave component present in the deviation signal $x(t_0)$. The value $W_x(t_0)$ is subsequently subtracted from the value $x(t_0)$ (step f). This is carried out by subtracting unit 35 and gives the value of the signal $S_x(t_0)$ in the direction of the X-axis and resulting from the wind, water flow and wave components in the deviation signal $x(t_0)$ insofar as the frequency thereof is below the frequency $f_c$. Each time a new sample of $x(t)$ has been stored, the step e is repeated, while taking into account the newly stored value of $x(t)$ to obtain the component $W_x$ of this new value of $x(t)$. This value $W_x$ is then subtracted from the newly stored value of $x(t)$ (step f) to obtain a new value of the signal $S_x$. The same impulse response of the filter $f(\tau, t_0)$ is used for all these operations, until after $T_p$ seconds a new auto-correlation function $R_{xx}(\tau, t_0)$ and a new impulse response $f(\tau, t_0)$ has been calculated.

In a similar manner as described above, the values of $S_y$ and $S_\varphi$ are calculated at time $t_0$, which values are vectorially added (step g) as shown in FIGS. 4 and 5, by the vector adding unit 36 to yield the vectors $V_A(t_0)$ and $V_B(t_0)$. Each time a new sample of $y(t)$ and $\phi(t)$ has been stored, new values of $S_y$ and $S_\varphi$ are calculated and vectorially combined with $S_x$ to generate the signals $V_A$ and $V_B$.

The dynamic stationing means further includes controllers 37 and 38 to process the signals $V_A$ and $V_B$, respectively. These controllers have proportional and, optionally, derivative and/or integrating action. After being processed, the signals are sent to the propulsion units 6 and 7 for controlling the magnitudes of the thrusts thereof as well as the directions of these thrusts. Equipment for such control is known per se and hence not described here in detail.

An analysis of the calculations as performed by the units according to FIG. 9 will now be given.

The time domain function $x(t)$ is representative of the deviation of the vessel in the direction of the X-axis. This function consists of two components $W_x(t)$ and $S_x(t)$. $W_x(t)$ represents the high frequency part of the signal $x(t)$, and consists of that part of the wave component having frequencies above frequency $f_c$. $W_x(t)$ further includes wind and water flow components having frequencies higher than $f_c$, should such components be present.

Removal of the high frequency part $W_x(t)$ of the deviation signal $x(t)$ at time $t_0$ would be possible if a minimum phase, low pass filter would be available, having an impulse response $F(\tau, t_0)$ such as would give the quantity:

$$E = \int [F(t, t_0) * x(t) - S_x(t)]^2 dt \qquad (1)$$

a minimum value. This would be the case if:

$$F(\tau, t_0) * R_{xx}(\tau, t_0) = R_{S_x S_x}(\tau, t_0) \qquad (2)$$

for $0 \leq \tau \leq T_F$, wherein $T_F$ represents the length of the filter $F(\tau, t_0)$. However, since $R_{S_x S_x}(\tau, t_0)$ is unknown, $F(\tau, t_0)$ cannot be determined in this way.

This problem is solved by calculating the impulse response $f(\tau, t_0)$ of a high pass filter, the relationship of which to $F(\tau, t_0)$ is indicated by:

$$F(\tau, t_0) = \delta(t) - f(\tau, t_0) \qquad (3)$$

wherein $\delta(t)$ is the unit pulse (Dirac-pulse).

$$\text{Since } W_x(t) = x(t) - S_x(t) \qquad (4)$$

equation (1) can be replaced by:

$$E = \int [f(t, t_0) * x(t) - W_x(t)]^2 dt \qquad (5)$$

From equation (5) it is seen that the problem of minimizing E can also be stated as finding a high pass filter with impulse response $f(t, t_0)$ such that the difference between the response of this filter to $x(t)$ and the signal $W_x(t)$ is minimal in a least square sense.

E will be minimal, if $$f(\tau, t_0) * R_{xx}(\tau, t_0) = R_{w_x w_x}(\tau, t_0) \qquad (6)$$

for $0 \leq \tau \leq T_f$, wherein $T_f$ represents the length of the filter $f(\tau, t_0)$.

Since the power spectrum of the wave component $W_x(t)$ in the deviation signal does not change over rather long periods (this is not the case with the signal $S_x(t)$ (which signal would be required in the calculation of the filter $F(\tau, t_0)$ as referred to above) the auto-correlation function $R_{W_x W_x}(\tau)$ as required in equation (6) can be determined at a time prior to time $t_0$, by passing the function $R_{xx}(\tau)$ through a high pass filter $g(\tau)$ with zero-phase spectrum for all frequencies. As $$R_{xx}(\tau) = R_{S_x S_x}(\tau) + R_{S_x W_x}(\tau) + R_{W_x S_x}(\tau) + R_{W_x W_x}(\tau) \quad (7)$$

and $R_{S_x W_x}(\tau)$ as well as $R_{W_x S_x}(\tau)$ are equal to zero since $S_x(t)$ and $W_x(t)$ are within different frequency bands, being separated by the cut-off frequency $f_c$ of the filter having the impulse response $g(\tau)$, and the cut-off frequency of the high pass filter $g(\tau)$ is chosen between the frequency band of $R_{S_x S_x}(\tau)$ and the frequency band of $R_{W_x W_x}(\tau)$, convolving of $R_{xx}(\tau)$ with $g(\tau)$ results in the auto-correlation function $R_{W_x W_x}(\tau)$.

As a result of the stationary property of $R_{W_x W_x}(\tau, t_0)$, this function is available at time $t = t_0$ and can be applied for computing $f(\tau, t_0)$.

The function $R_{W_x W_x}(\tau, t_0)$ is kept constant over the period $T_p$ and is applied to determine the filter function $f(\tau, t_0)$ by deconvolving this function $R_{W_x W_x}(\tau, t_0)$ with respect to the function $R_{xx}(\tau, t_0)$ (cf. equation 6). For stability purposes, it is advisable to add in the deconvolution process some positive value to $R_{xx}(0, t_0)$, say 1 percent.

In conclusion, it can be said that it follows from equation (6) that the computed high pass filter $f(\tau, t_0)$ will determine from the deviation signal $x(t) = S_x(t) + W_x(t)$ a signal $W_x(t) = f(t, t_0) * x(t)$, which is close to the high frequency part $W_x(t)$ of the wave component present in the deviation signal $x(t)$.

This computation can be carried out, since
1) the least square criterium needs only correlation functions,
2) $S_x(t)$ and $W_x(t)$ are in different frequency bands, and
3) the power spectrum of $W_x(t)$ does not change over the period $T_p$, which allows computing of $R_{W_x W_x}(\tau, t_0)$ prior to time $t_0$.

The quantities $T_x$, $\Delta t$, $T_p$, $T_R$, $T_W$, $T_g$ and $T_f$ as described above, may for practical purposes have the following values. It is to be understood that these values are preferred values, to which the application of the invention is not limited.

$T_x$ = time window over which samples are taken of the deviation signal $x(t) = 200$ to 2000 seconds.

$\Delta t$ = sample time for deviation signal $x(t) = 0.1 - 1$ second.

Step $b$ for calculating the auto-correlation function $R_{xx}(\tau, t_0)$ is carried out once in every period $T_p = 1$ to 1000 seconds. The same period applies for steps $c$ and $d$.

Steps $e$ and $f$ for calculating the value of the control signal $S_x(t_0)$ are carried out every $\Delta t = 0.1 - 1$ second.

The length $T_R$ of the auto-correlation function $R_{xx}(\tau, t_0)$ is between 200 and 1000 seconds.

The length $T_W$ of the auto-correlation function $R_{W_x W_x}(\tau, t_0)$ is between 100 and 500 seconds.

The length $T_g$ of the impulse response $g(\tau)$ is between 50 and 250 seconds.

The length $T_R = T_W + 2 T_g$.

The length $T_f$ of the high pass filter $f(\tau, t_0)$ is between 50 and 250 seconds.

It will be understood that the calculations which have to be carried out to determine the values of the signals $S_y$ and $S_\varphi$ are similar to the calculations described with reference to the signal $S_x$ and that the values of the periods in which these calculations take place, as well as the lengths of the auto-correlation functions, the time window and the filters are preferably equal to the values discussed with reference to signal $S_x$.

It will further be understood that although the calculations required for determining the values $S_x$, $S_y$ and $S_\varphi$, as well as the vectorial additions thereof may take place in separate units, it is attractive to apply a single computer for all these calculations. Multiplexing equipment may then be applied for feeding the information on the measured deviation signals $x(t)$, $y(t)$ and $\phi(t)$ to the computer. The high speed at which the various calculations may be carried out allows the deviation signals to be processed within extremely small time periods, thus making the filtered signals $S_x$, $S_y$ and $S_\varphi$ as well as the vector signals $V_A$ and $V_B$ available almost instantaneously, once the information on the deviation of the vessel from the desired location has been measured by the measuring equipment.

For measuring the deviations along two co-ordinates (perpendicularly or non-perpendicularly arranged with respect to each other), a taut wire may be applied, which wire extends between a fixed point on the sea bottom and the vessel, and is provided with means for measuring the angles between the wire and two planes. Further, there are numerous other types of position measuring equipment, such as those based on acoustic or electrical waves which are transmitted from fixed points and which, when detected by receivers mounted on the vessel, can give an indication of the position of the vessel relative to these points. All these types of position measuring equipment, as well as other types suitable for the purpose, are known per se, and hence not described here in detail.

The angular deviation with respect to an axis may be measured by means of any equipment suitable for the purpose, such as a compass mounted on the vessel. It will be understood that control of this co-ordinate is not always required, and that the dynamic stationing method according to the invention may also be restricted to a control of the deviations along two co-ordinates only.

The separate vector adding unit applied for calculating the vectors $V_A$ and $V_B$, which are to be supplied to the propulsion units 6 and 7, may be omitted if the propulsion units are of the Voith-Schneider type, since the signals $S_x$, $S_y$ and $S_\varphi$ can then directly be supplied to the steering means of these propulsion units.

The means for reducing the deviation of the vessel shown in FIG. 1 from a desired position comprises two propulsion units. However, the invention may also be applied for dynamically stationing vessels equipped with any other type of means for reducing the deviation. These means may include one, three or more propulsion units of any design, and/or one or more rudders, all of these means, or at least some of them, being controlled by control signals derived from the deviation signals.

Alternatively, the controllers provided with proportional and, optionally, derivative and/or integral action may be applied for processing the signals $x$, $y$ and $\phi$ or the signals $S_x$, $S_y$ and         instead of the vectors $V_A$ and $V_B$. When applying a single computer instead if the calculating units shown in FIG. 9, these controllers may, just like the vector adding unit, be incorporated in the computer.

Alternatively, the processing steps described with reference to FIG. 9 in relation to the deviation signals $x(t)$, $y(t)$ and $\phi(t)$ may be applied for processing the vectors $V_A(t)$ and $V_B(t)$ which are obtained from a vector adding unit to which the signals $x(t)$, $y(t)$ and $\phi(t)$ are fed.

The selective wave attenuation method need not be applied to all the components of the signal indicating the deviation of a vessel from a desired position. If desired, the method according to the invention may be applied to control the deviations $x$ and $y$ only.

The method may further be applied for controlling the deviation along a single co-ordinate only, such as for controlling the deviation in a rotational sense. This will be of interest when steering a ship in a fixed direction. The ship is then kept on a pre-selected heading and the high frequency portion of the wave component in the signal indicating the deviation from the preselected heading is removed therefrom by the filtering technique according to the invention. The filtered signal is then supplied to the actuating means of at least one of the rudders of the vessel and/or to the actuating means of propulsion means suitable to raise forces acting athwartships.

We claim as our invention:

1. A method for dynamically stationing a floating vessel of the type provided with a means for measuring along at least one coordinate the deviation of the vessel from a desired position and for generating in the time domain a deviation signal representative of the measured deviation and provided with a drive means suitable to be controlled by a control signal derived from the deviation signal to reduce the deviation along the coordinate by generating directional forces tending to move the vessel, said method comprising:
   filtering the deviation signal by synthetizing a filter impulse response capable of generating from the deviation signal a filter signal representing the portion of the deviation signal resulting from wave action;
   generating the auto-correlation function of the filter signal by convolving the filter signal with the auto-correlation function of the deviation signal, said auto-correlation function of the filter signal being generated periodically with the oldest auto-correlation function being discarded each time a new auto-correlation function of the filter signal is generated;
   subtracting the auto-correlation function of the filter signal from the deviation signal to form a filtered signal; and
   applying the filtered signal to the means used to control the drive means to reduce the deviation.

2. A method according to claim 1, wherein the length of the auto-correlation function of the deviation signal is between 200 and 1000 seconds.

3. A method according to claim 2, wherein the time gate over which the deviation signal is auto-correlated has a length between 200 and 2000 seconds.

4. A method according to claim 1, wherein the length of the zero-phase filter is between 50 and 250 seconds.

5. A method according to claim 1, wherein the length $T_f$ of the filter is between 50 and 250 seconds.

6. A method according to claim 1, wherein the filter impulse response is synthetized periodically every 1 to 100 seconds.

7. A method according to claim 6 wherein the deviation signal is sampled periodically every 0.1 to 1 second.

8. Apparatus for dynamically stationing a floating vessel, comprising:
   1. a system for measuring along at least one co-ordinate the deviation of the vessel from a desired position and for generating, in the time domain, a deviation signal that is representative of the measured deviation,
   2. a controller,
   3. an output suitable to be connected to means adapted to reduce the deviation of a vessel as measured along the co-ordinate, and
   4. a filter for attenuating at least a selected portion of the wave component present in the deviation signal, said filter including a system for sampling the deviation signal and storing a limited number of samples with relation to the sampling time, by discarding the oldest sample each time a new sample is added, the controller and the filter being interposed between the measuring system and the output.

9. Apparatus according to claim 8, wherein the filter includes a system for synthetizing a filter impulse response, calculating means for convolving this impulse response with the deviation signal and a subtractor for subtracting the result of this convolution from the deviation signal.

10. Apparatus according to claim 8, wherein the filter includes a system for calculating the auto-correlation function of the deviation signal, a system for calculating a filter impulse response, which when convolved within a time gate $0 - T_f$, $T_f$ being the filter length, with the auto-correlation of the deviation signal will generate the auto-correlation function of that part of the deviation signal which is in the frequency band comprising the selected part of the wave component of the deviation signal, a system for convolving this filter impulse response with the deviation signal, and a subtractor for subtracting the result of this latter convolution from the deviation signal.

11. Apparatus according to claim 10, including a system for calculating the auto-correlation function of that part of the deviation signal which is in the frequency band comprising the selected part of the wave component of the deviation signal by convolving the auto-correlation function of the deviation signal with the impulse response of a filter having an amplitude spectrum with relatively high values for the frequency band comprising the selected part of the wave component present in the deviation signal and relatively low values for frequencies outside this band, and further having a phase spectrum that is zero for all frequencies.

* * * * *